US006606057B2

(12) United States Patent
Chiang et al.

(10) Patent No.: US 6,606,057 B2
(45) Date of Patent: Aug. 12, 2003

(54) HIGH GAIN PLANAR SCANNED ANTENNA ARRAY

(75) Inventors: Bing Chiang, Melbourne, FL (US); Griffin K. Gothard, Satellite Beach, FL (US); Christopher A. Snyder, Palm Bay, FL (US); Kenneth M. Gainey, Satellite Beach, FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/845,133

(22) Filed: Apr. 30, 2001

(65) Prior Publication Data

US 2002/0158798 A1 Oct. 31, 2002

(51) Int. Cl.$^7$ .......................... H01Q 3/02; H01Q 19/06; H01Q 19/10; G01S 5/04

(52) U.S. Cl. ....................... 342/374; 342/435; 343/753; 343/818; 343/833

(58) Field of Search ................................ 342/435, 372, 342/374, 398, 416, 408; 455/277.1; 343/749, 750, 751, 754, 818, 819, 833, 753

(56) References Cited

U.S. PATENT DOCUMENTS

| | | | | | |
|---|---|---|---|---|---|
| 2,928,087 | A | * | 3/1960 | Parker | 342/399 |
| 3,109,175 | A | * | 10/1963 | Llyod | 343/761 |
| 3,560,978 | A | * | 2/1971 | Himmel et al. | 342/399 |
| 4,071,847 | A | * | 1/1978 | Pickles | 342/398 |
| 4,387,378 | A | * | 6/1983 | Henderson | 342/374 |
| 4,700,197 | A | * | 10/1987 | Milne | 343/837 |
| 5,132,698 | A | * | 7/1992 | Swineford | 343/846 |
| 5,617,102 | A | | 4/1997 | Prater | |
| 6,317,092 | B1 | * | 11/2001 | de Schweinitz et al. | 343/753 |
| 6,407,719 | B1 | * | 6/2002 | Ohira et al. | 343/750 |
| 2002/0003497 | A1 | * | 1/2002 | Gilbert et al. | 343/700 MS |
| 2002/0024468 | A1 | * | 2/2002 | Palmer et al. | 343/702 |

FOREIGN PATENT DOCUMENTS

EP 1035614 A2 * 9/2000 ............ H01Q/3/24

OTHER PUBLICATIONS

John D. Kraus; Antennas, Second Edition; 1988; McGraw–Hill, Inc.

* cited by examiner

*Primary Examiner*—Gregory C. Issing
(74) *Attorney, Agent, or Firm*—John L. DeAngelis, Jr.; Beusse Brownlee Bowdoin & Wolter, P.A.

(57) ABSTRACT

An antenna array having a central active element and a plurality of passive elements surrounding the active element is disclosed. A dielectric substrate or other slow wave structure is disposed radially outwardly from the passive elements for slowing the radio frequency waves so as to increase the antenna directivity by reducing the amount of energy radiated in the elevation direction.

34 Claims, 8 Drawing Sheets

HIGH GAIN PLANAR SCANNED ANTENNA ARRAY

FIELD OF THE INVENTION

This invention relates to mobile or portable cellular communication systems and more particularly to an antenna apparatus for use with a mobile or portable subscriber unit that communicates with a base station, wherein the antenna apparatus offers improved beam-forming capabilities by increasing the antenna gain in both the azimuth and the elevation directions.

BACKGROUND OF THE INVENTION

Code division multiple access (CDMA) communication systems provide wireless communications between a base station and one or more mobile or portable subscriber units. The base station is typically a computer-controlled set of transceivers that are interconnected to a land-based public switched telephone network (PSTN). The base station further includes an antenna apparatus for sending forward link radio frequency signals to the mobile subscriber units and for receiving reverse link radio frequency signals transmitted from each mobile unit. Each mobile subscriber unit also contains an antenna apparatus for the reception of the forward link signals and for the transmission of the reverse link signals. A typical mobile subscriber unit is a digital cellular telephone handset or a personal computer coupled to a cellular modem. In such systems, multiple mobile subscriber units may transmit and receive signals on the same center frequency, but different modulation codes are used to distinguish the signals sent to or received from individual subscriber units.

In addition to CDMA, other wireless access techniques employed for communications between a base station and one or more portable or mobile units include those described by the Institute of Electrical and Electronics Engineers (IEEE) 802.11 standard and the so-called "Bluetooth" industry-developed standard. All such wireless communications techniques require the use of an antenna at both the receiving and transmitting end. It is well-known that increasing the antenna gain in any wireless communication system has beneficial effects on the wireless system performance.

The most common type of antenna for transmitting and receiving signals at a mobile subscriber unit is a monopole or omnidirectional antenna. This type of antenna consists of a single wire or antenna element that is coupled to a transceiver within the subscriber unit. The transceiver receives reverse link audio or data for transmission from the subscriber unit and modulates the signals onto a carrier signal at a specific frequency and modulation code (i.e., in a CDMA system) assigned to that subscriber unit. The modulated carrier signal is transmitted by the antenna. Forward link signals received by the antenna element at a specific frequency are demodulated by the transceiver and supplied to processing circuitry within the subscriber unit.

The signal transmitted from a monopole antenna is omnidirectional in nature. That is, the signal is sent with approximately the same signal strength in all directions in a generally horizontal plane. Reception of a signal with a monopole antenna element is likewise omnidirectional. A monopole antenna does not differentiate in its ability to detect a signal in one direction versus detection of the same or a different signal coming from another direction. Also, a monopole antenna does not produce significant radiation in the zenith direction. The antenna pattern is commonly referred to as a donut shape with the antenna element located at the center of the donut hole.

A second type of antenna that may be used by mobile subscriber units is described in U.S. Pat. No. 5,617,102. The system described therein provides a directional antenna comprising two antenna elements mounted on the outer case of a laptop computer, for example. The system includes a phase shifter attached to each element. The phase shifters impart a phase angle delay to the signal input thereto, thereby modifying the antenna pattern (which applies to both the receive and transmit modes) to provide a concentrated signal or beam in a selected direction. Concentrating the beam is referred to as an increase in antenna gain or directivity. The dual element antenna of the cited patent thereby directs the transmitted signal into predetermined sectors or directions to accommodate for changes in orientation of the subscriber unit relative to the base station, thereby minimizing signal losses due to the orientation change. In accordance with the antenna reciprocity theorem, the antenna receive characteristics are similarly effected by the use of the phase shifters.

CDMA cellular systems are recognized as interference limited systems. That is, as more mobile or portable subscriber units become active in a cell and in adjacent cells, frequency interference increases and thus bit error rates also increase. To maintain signal and system integrity in the face of increasing error rates, the system operator decreases the maximum data rate allowable for one or more users, or decreases the number of active subscriber units, which thereby clears the airwaves of potential interference. For instance, to increase the maximum available data rate by a factor of two, the number of active mobile subscriber units can be decreased by one half. However, this technique is not typically employed to increase data rates due to the lack of priority assignments for individual system users. Finally, it is also possible to avert excessive interference by using directive antennas at both (or either) the base station and the portable units.

Generally, a directive antenna beam pattern can be achieved through the use of a phased array antenna. The phased array is electronically scanned or steered to the desired direction by controlling the input signal phase to each of the phased array antenna elements. However, antennas constructed according to these techniques suffer decreased efficiency and gain as the element spacing becomes electrically small as compared to the wavelength of the transmitted or received signal. When such an antenna is used in conjunction with a portable or mobile subscriber unit, the antenna array spacing is relatively small and thus antenna performance is correspondingly compromised.

SUMMARY OF THE INVENTION

Problems of the Prior Art

Various problems are inherent in prior art antennas used on mobile subscriber units in wireless communications systems. One such problem is called multipath fading. In multipath fading, a radio frequency signal transmitted from a sender (either a base station or mobile subscriber unit) may encounter interference in route to the intended receiver. The signal may, for example, be reflected from objects, such as buildings, thereby directing a reflected version of the original signal to the receiver. In such instances, the receiver receives two versions of the same radio signal; the original version and a reflected version. Each received signal is at the same frequency, but the reflected signal may be out of phase with the original signal due to the reflection and consequent differential transmission path length to the receiver. As a result, the original and reflected signals may partially or completely cancel each other (destructive interference), resulting in fading or dropouts in the received signal, hence the term multipath fading.

Single element antennas are highly susceptible to multipath fading. A single element antenna has no way of determining the direction from which a transmitted signal is sent and therefore cannot be tuned to more accurately detect and receive a signal in any particular direction. Its directional pattern is fixed by the physical structure of the antenna. Only the antenna position or orientation can be changed in an effort to obviate the multipath fading effects.

The dual element antenna described in the aforementioned reference is also susceptible to multipath fading due to the symmetrical and opposing nature of the hemispherical lobes formed by the antenna pattern when the phase shifter is activated. Since the lobes created in the antenna pattern are more or less symmetrical and opposite from one another, a signal reflected toward the back side of the antenna (relative to a signal originating at the front side) can be received with as much power as the original signal that is received directly. That is, if the original signal reflects from an object beyond or behind the intended receiver (with respect to the sender) and reflects back at the intended receiver from the opposite direction as the directly received signal, a phase difference in the two signals creates destructive interference due to multipath fading.

Another problem present in cellular communication systems is inter-cell signal interference. Most cellular systems are divided into individual cells, with each cell having a base station located at its center. The placement of each base station is arranged such that neighboring base stations are located at approximately sixty degree intervals from each other. Each cell may be viewed as a six sided polygon with a base station at the center. The edges of each cell abut and a group of cells form a honeycomb-like image if each cell edge were to be drawn as a line and all cells were viewed from above. The distance from the edge of a cell to its base station is typically driven by the minimum power required to transmit an acceptable signal from a mobile subscriber unit located near the edge of the cell to that cell's base station (i.e., the power required to transmit an acceptable signal a distance equal to the radius of one cell).

Intercell interference occurs when a mobile subscriber unit near the edge of one cell transmits a signal that crosses over the edge into a neighboring cell and interferes with communications taking place within the neighboring cell. Typically, signals in neighboring cells on the same or closely-spaced frequencies cause intercell interference. The problem of intercell interference is compounded by the fact that subscriber units near the edges of a cell typically employ higher transmit powers so that their transmitted signals can be effectively received by the intended base station located at the cell center. Also, the signal from another mobile subscriber unit located beyond or behind the intended receiver may arrive at the base station at the same power level, causing additional interference.

The intercell interference problem is exacerbated in CDMA systems, since the subscriber units in adjacent cells typically transmit on the same carrier or center frequency. For example, generally, two subscriber units in adjacent cells operating at the same carrier frequency but transmitting to different base stations interfere with each other if both signals are received at one of the base stations. One signal appears as noise relative to the other. The degree of interference and the receiver's ability to detect and demodulate the intended signal is also influenced by the power level at which the subscriber units are operating. If one of the subscriber units is situated at the edge of a cell, it transmits at a higher power level, relative to other units within its cell and the adjacent cell, to reach the intended base station. But, its signal is also received by the unintended base station, i.e., the base station in the adjacent cell. Depending on the relative power level of two same-carrier frequency signals received at the unintended base station, it may not be able to properly differentiate a signal transmitted from within its cell from the signal transmitted from the adjacent cell. There is required a mechanism for reducing the subscriber unit antenna's apparent field of view, which can have a marked effect on the operation of the forward link (base to subscriber) by reducing the number of interfering transmissions received at a base station. A similar improvement in the reverse link antenna pattern allows a reduction in the desired transmitted signal power, to achieve a receive signal quality.

BRIEF DESCRIPTION OF THE PRESENT INVENTION

The present invention provides an inexpensive antenna apparatus for use with a mobile or portable subscriber unit in a wireless same-frequency communications system, such as a CDMA cellular communications system.

The present invention provides an antenna apparatus that maximizes effective radiated and/or received energy. The antenna according to the present invention accomplishes the gain improvement by the use of a ring array of passive monopole or dipole antenna elements with an active feed element at the center, and further including a dielectric substrate ring surrounding the ring array of antenna elements such that the array of passive elements and the active feed element are located within the interior of the dielectric substrate ring. Use of the dielectric substrate ring improves the directivity of the antenna array by providing significantly higher gain, without adding to the height of each array element. The dielectric substrate ring is a slow wave structure that slows the radio frequency energy passing through it and in this way reduces the radiation directed in the elevation direction. Also, by controlling certain characteristics of the passive elements (to be discussed below) the antenna array is scanable in the azimuth plane. Generally, the antenna array ground plane must be enlarged to accommodate the additional parasitic structure, i.e., the dielectric substrate ring. Thus, the advantage offered by the present invention is a significantly improved antenna directivity (in one embodiment by 4 dB) operative in both an omnidirectional and a beam mode. By providing higher antenna gain at the mobile or portable units, the intercell interference problem is reduced, the effect of which allows for acceptable communications over greater distances, a higher bandwidth for each portable subscriber, and/or the ability to accommodate more subscribers within adjacent cells of the system.

As a result of the improved antenna directivity, the effective transmit power is increased. Thus, the number of active subscriber units in a cell can remain the same, while the antenna apparatus of the present invention provides increased data rates for each subscriber unit beyond those achievable by prior art antennas. Alternatively, if data rates are to be maintained at a given value, more subscriber units may become simultaneously active in a single cell using the antenna apparatus described herein. In either case, the cell capacity is increased, as measured by the sum total of data being communicated at any given time.

Forward link communications capacity also increases due to the directional reception capabilities of the antenna apparatus. Since the antenna apparatus is less susceptible to interference from adjacent cells, the forward link system capacity can be increased by adding more users or by increasing the cell radius.

BRIEF DESCRIPTION OF THE DRAWINGS

The foregoing and other features and advantages of the invention will be apparent from the following description of the preferred embodiments of the invention, as illustrated in the accompanying drawings in which like referenced characters refer to the same parts throughout the different figures. The drawings are not necessarily to scale, emphasis instead being placed upon illustrating the principles of the invention.

DETAILED DESCRIPTION OF THE PREFERRED EMBODIMENTS

Figure 1:
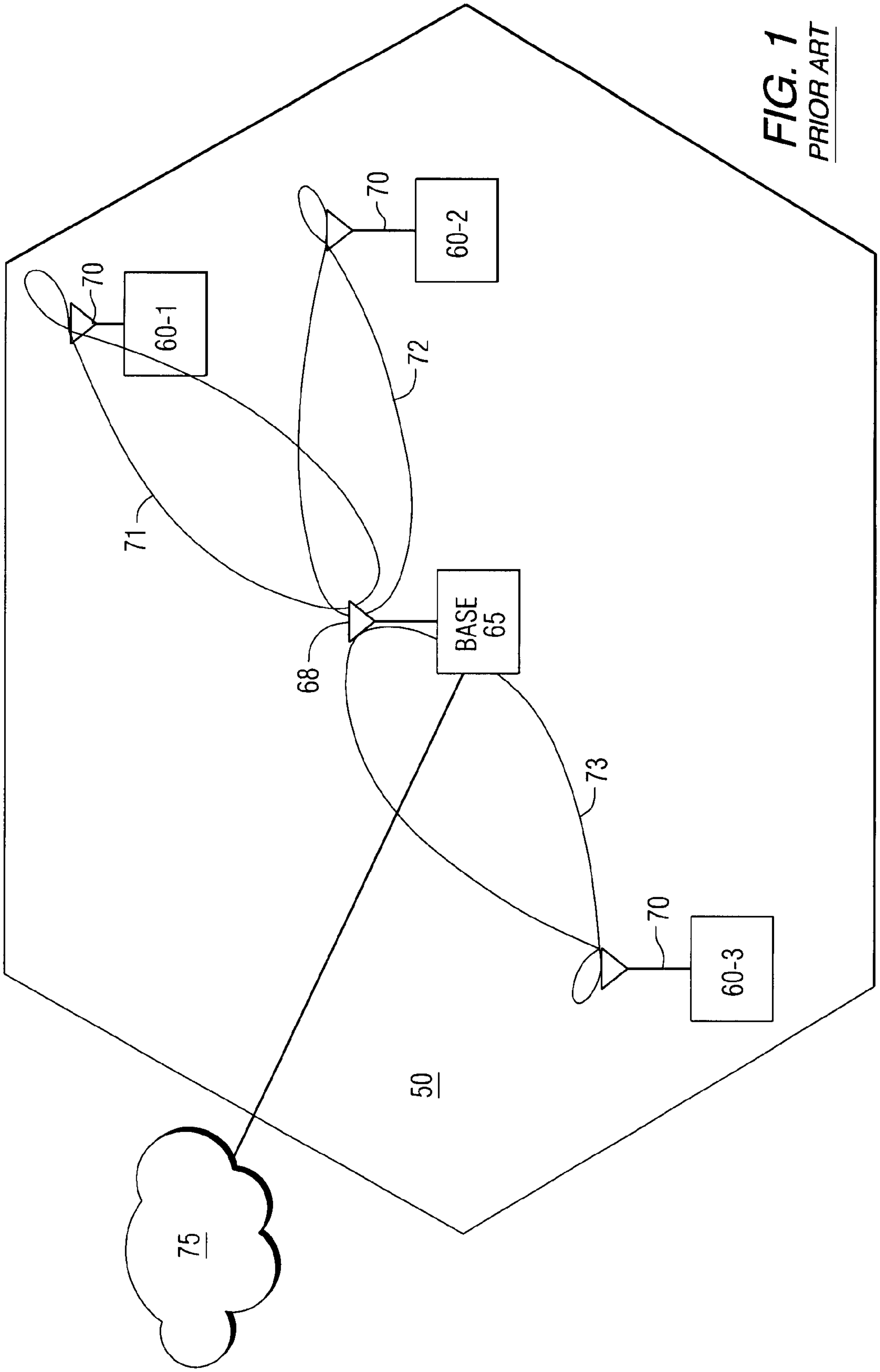
FIG. 1 PRIOR ART
FIG. 1 illustrates a cell of a CDMA cellular communication system.

FIG. 1 illustrates one cell 50 of a typical CDMA cellular communication system. The cell 50 represents a geographical area in which mobile subscriber units 60-1 through 60-3 communicate with a centrally located base station 65. Each subscriber unit 60 is equipped with an antenna 70 configured according to the present invention. The subscriber units 60 are provided with wireless data and/or voice services by the system operator and can connect devices such as, for example, laptop computers, portable computers, personal digital assistants (PDAs) or the like through base station 65 (including the antenna 68) to a network 75, which can be the public switched telephone network (PSTN), a packet switched computer network, such as the Internet, a public data network or a private intranet. The base station 65 communicates with the network 75 over any number of different available communications protocols such as primary rate ISDN, or other LAPD based protocols such as IS-634 or V5.2, or even TCP/IP if the network 75 is a packet based Ethernet network such as the Internet. The subscriber units 60 may be mobile in nature and may travel from one location to another while communicating with the base station 65. As the subscriber units leave one cell and enter another, the communications link is handed off from the base station of the exiting cell to the base station of the entering cell.

FIG. 1 illustrates one base station 65 and three mobile subscriber units 60 in a cell 50 by way of example only and for ease of description of the invention. The invention is applicable to systems in which there are typically many more subscriber units communicating with one or more base stations in an individual cell, such as the cell 50.

It is also to be understood by those skilled in the art that FIG. 1 represents a standard cellular type communications system employing signaling schemes such as a CDMA, TDMA, GSM or others, in which the radio channels are assigned to carry data and/or voice between the base stations 65 and subscriber units 60. In a preferred embodiment, FIG. 1 is a CDMA-like system, using code division multiplexing principles such as those defined in the IS-95B standards for the air interface.

In one embodiment of the cell-based system, the mobile subscriber units 60 employ an antenna 70 that provides directional reception of forward link radio signals transmitted from the base station 65, as well as directional transmission of reverse link signals (via a process called beam forming) from the mobile subscriber units 60 to the base station 65. This concept is illustrated in FIG. 1 by the example beam patterns 71 through 73 that extend outwardly from each mobile subscriber unit 60 more or less in a direction for best propagation toward the base station 65. By directing transmission more or less toward the base station 65, and directively receiving signals originating more or less from the location of the base station 65, the antenna apparatus 70 reduces the effects of intercell interference and multipath fading for the mobile subscriber units 60. Moreover, since the antenna beam patterns 71, 72 and 73 extend outward in the direction of the base station 65 but are attenuated in most other directions, less power is required for transmission of effective communications signals from the mobile subscriber units 60-1, 60-2 and 60-3 to the base station 65.

Figure 2:
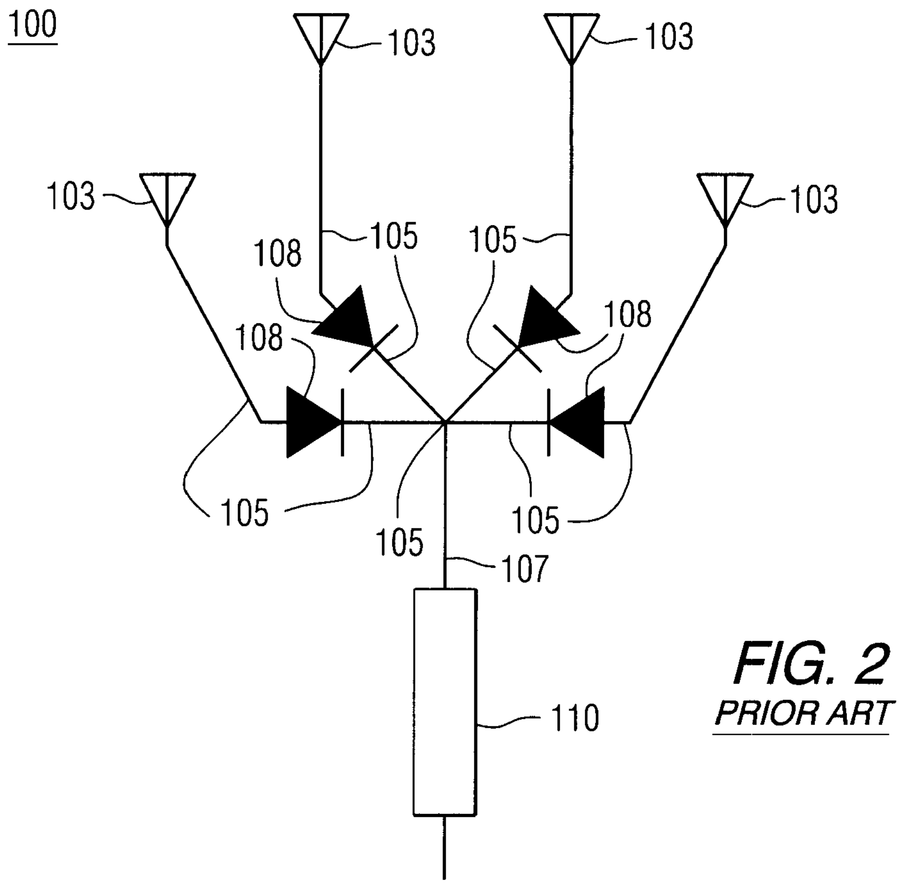
FIG. 2 PRIOR ART
FIGS. 2 and 3 illustrate antenna structures for increasing antenna gain to which the teachings of the present invention can be applied.

One antenna array embodiment providing a directive beam pattern and further to which the teachings of the present invention can be applied, is illustrated in FIG. 2. The FIG. 2 antenna array 100 comprises a four-element circular array provided with four antenna elements 103. A single-path network feeds each of the antenna elements 103. The network comprises four fifty-ohm transmission lines 105 meeting at a junction 106, with a 25-ohm transmission line 107. Each of the antenna feed lines 105 has a switch 108 interposed along the feed line. In FIG. 2, each switch 108 is represented by a diode, although those skilled in the art recognize that other techniques can be employed, including the use of a single-pole-double-throw (SPDT) switch. In any case, each of the antenna elements 103 is independently controlled by its respective switch 108. A 35-ohm quarter-wave transformer 110 matches the 25-ohm transmission line 107 to the 50-ohm transmission lines 105.

In operation, typically two adjacent antenna elements 103 are connected to the transmission lines 105 via closing of the associated switches 108. Those elements 103 serve as active elements, while the remaining two elements 103 for which the switches 108 are open, serve as reflectors. Thus any adjacent pair of the switches 108 can be closed to create the desired antenna beam pattern. The antenna array 100 can also be scanned by successively opening and closing the adjacent pairs of switches 108, changing the active elements of the antenna array 100 to effectuate the beam pattern movement. In another embodiment of the antenna array 100, it is also possible to activate only one element, in which case the transition line 107 has a 50-ohm characteristic impedance and the quarter-wave transformer 110 is unnecessary.

Figure 3:
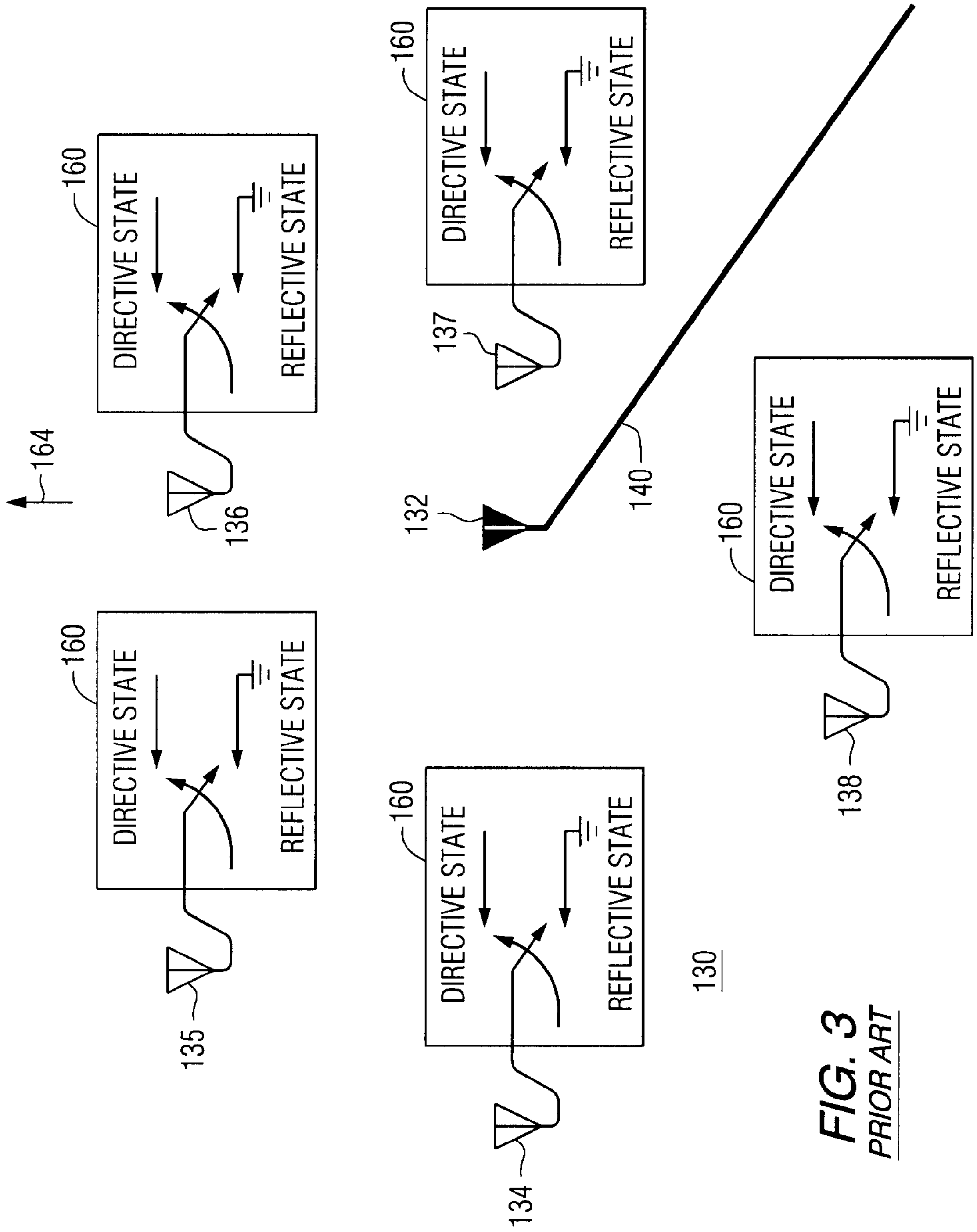
FIG. 3 PRIOR ART

Another antenna design that presents an inexpensive, electrically small, low loss, low cost, medium directivity, electronically scanable antenna array is illustrated in FIG. 3. This antenna array 130 includes a single excited antenna element surrounded by electronically tunable passive elements that serve as directors or reflectors as desired. The antenna array 130 includes a single central active element 132 surrounded by five passive reflector-directors 134 through 138. The reflector-directors 134–138 are also referred to as passive elements. In one embodiment, the active element 132 and the passive elements 134 through 138 are dipole antennas. As shown, the active element 132 is electrically connected to a fifty ohm transmission line 140. Each passive element 134 through 138 is attached to a single-pole double throw (SPDT) switch 160. The position of the switch 160 places each of the passive elements 134 through 138 in either a directive or a reflective state. When in a directive state, the antenna element is virtually invisible to the radio frequency signal and therefore directs the radio frequency energy in the forward direction, in the reflective state the radio frequency energy is returned in the direction of the source.

Electronic scanning is implemented through the use of the SPDT switches 160. Each switch 160 couples its respective passive element into one of two separate open or short-circuited transmission line stubs. The length of each transmission line stub is predetermined to generate the necessary reactive impedance for the passive elements 134 through 138, such that the directive or reflective state is achieved. The reactive impedance can also be realized through the use of an application-specific integrated circuit or a lumped reactive load.

When in use, the antenna array 130 provides a fixed beam directive pattern in the direction identified by the arrowhead 164 by placing the passive elements 134, 137 and 138 in the reflective state while the passive elements 135 and 136 are switched to the directive state. Scanning of the beam is accomplished by progressively opening and closing adjacent switches 160 in the circle formed by the passive elements 134 through 138. An omnidirectional mode is achieved when all of the passive elements 134 through 138 are placed in the directive state.

As will be appreciated by those skilled in the art, the antenna array 130 has N operating directive modes, where N is the number of passive elements. The fundamental array mode requires switching all of the N passive elements to the directive state to achieve an omnidirectional far-field pattern. Progressively increasing directivity can be achieved by switching from one to approximately half the number of passive elements into the reflective state, while the remaining elements are directive.

Figure 4:
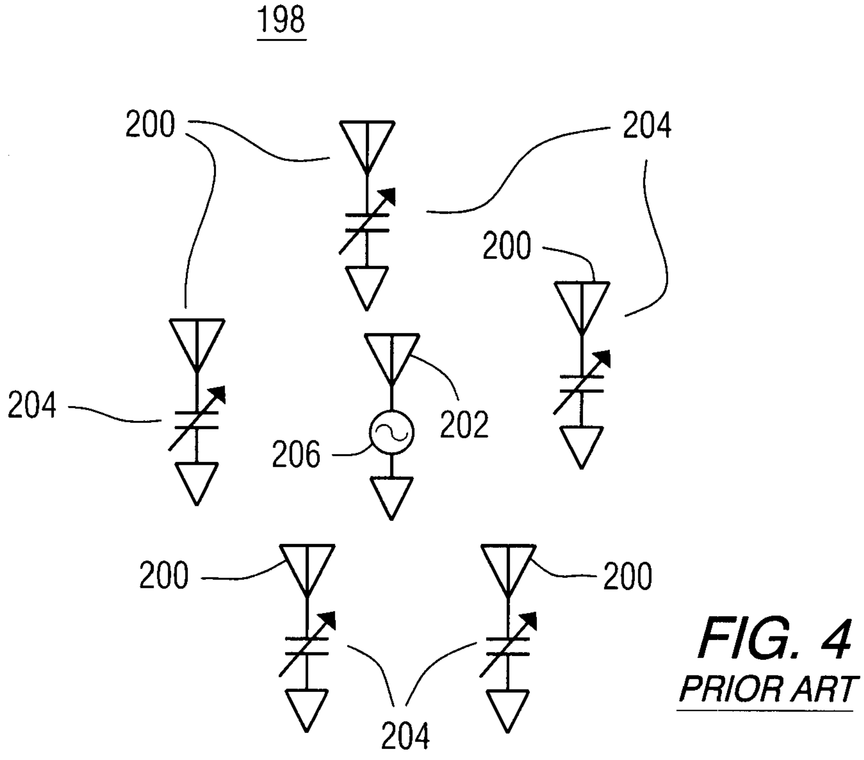
FIG. 4 PRIOR ART
FIG. 4 illustrates an antenna array wherein each antenna has a variable reactive load.

FIG. 4 illustrates an antenna array 198 comprising six vertical monopoles 200 arranged at an approximately equal radius (and having approximately equal angular spacing there between), from a center element 202. The center element is the active element, in the transmitting mode, as indicated by the alternating input signal referred to with reference character 206. According to the antenna reciprocity theorem, the active element 202 functions in a reciprocal manner for signals transmitted to the antenna array 198. The passive elements 200 shape the radiation pattern from (or to) the active element 202 by selectively providing reflective or directive properties at their respective location. The reflective/directive properties or a combination of both is determined by the setting of the variable reactance element 204 associated with each of the passive elements 200. When the passive elements 200 are configured to serve as directors, the radiation transmitted by the active element 202 (or received by the active element 202 in the receive mode) passes through the ring of passive elements 200 to form an omnidirectional antenna beam pattern. When the passive elements 200 are configured in the reflective mode, the radio frequency energy transmitted from the active element 202 is reflected back toward the center of the antenna ring. Generally, it is known that changing the resonant length causes an antenna element to become reflective (when the element is longer than the resonant length, wherein the resonant length is defined as $\lambda/2$ or $\lambda/4$ if a ground plane is present) or directive/transparent (when the element is shorter than the resonant length). A continuous distribution of reflectors among the passive elements 200 collimates the radiation pattern in the direction of those elements configured as directors. As shown in FIG. 4, each of the passive elements 200 and the active element 202 are oriented for vertical polarization of the transmitted or received signal. It is known to those skilled in the art that horizontal placement of the antenna elements results in horizontal signal polarization. For horizontal polarization, the active element 202 is replaced by a loop or annular ring antenna and the passive elements 202 are replaced by horizontal dipole antennas.

Figure 5:
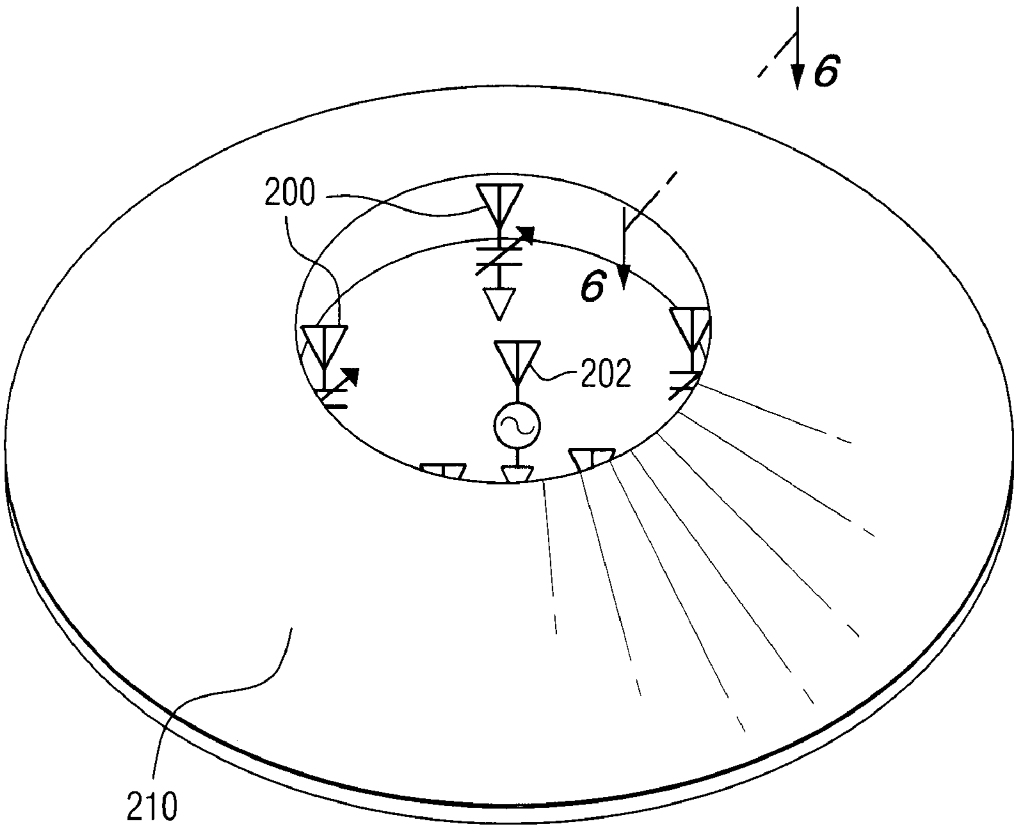
FIGS. 5 and 6 illustrate the dielectric ring in conjunction with the present invention.

According to the teachings of the present invention, the energy passing through the directive configured passive elements 200 can be further shaped into a more directive antenna beam. As shown in FIG. 5, the beam is shaped by placement of an annular dielectric substrate 210 around the antenna array 198. The dielectric substrate is in the shape of a ring with an outer band defining an interior aperture, with the passive elements 200 and the active element 202 disposed within the interior aperture. The dielectric substrate 210 is a slow wave structure having a lower propagation constant than air. As a result, the portion of the transmitted wave (or the received wave in the receive mode) that contacts the dielectric substrate 210 is guided and slowed relative to the free space portion of the wave. As a result, the radiation pattern in the elevation direction narrows (the elevation energy is attenuated) and the radiation is focused in the azimuth direction. Thus the antenna beam pattern gain is increased. The slow-wave structure essentially guides the power or radiated energy along the dielectric slab to form a more directive beam. In one embodiment, the radius of the dielectric substrate 210 is at least a half wavelength. As is known to those skilled in the art, a slow wave structure can take many forms, including a dielectric slab, a corrugated conducting surface, conductive gratings or any combination thereof.

Typically, the variable reactance elements 204 are tuned to optimize operation of the passive elements 200 with the dielectric substrate 210. For a given operational frequency, once the optimum distance between the passive elements 200 and the circumference of the interior aperture of the dielectric substrate 210 has been established, this distance remains unchanged during operation at the given frequency.

Figure 6:
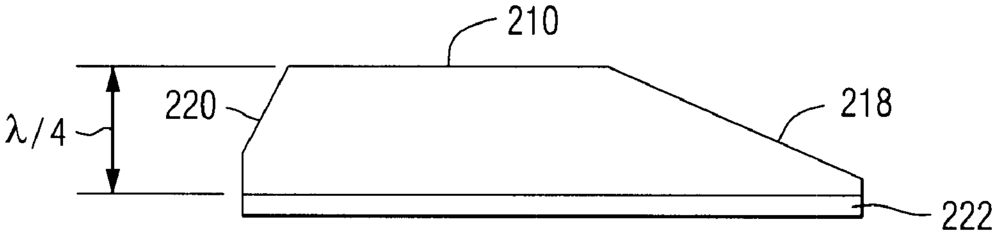

FIG. 6 illustrates the dielectric substrate 210 along cross section AA' of FIG. 5. The dielectric substrate 210 includes two tapered edges 218 and 220. A ground plane 222 below the dielectric substrate 210 can also be seen in this view. Both of these tapered edges 218 and 220 edges ease the transition from air to substrate or vice versa. Abrupt transitions cause reflections of the incident wave which, in this situation, reduces the effect of the slow-wave structure.

Although the tapers 218 and 220 are shown of unequal length, those skilled in the art will recognize that a longer taper provides a more advantageous transition between the free space propagation constant and the dielectric propagation constant. The taper length is also dependent upon the space available for the dielectric slab 210. Ideally, the tapers should be long if sufficient space is available for increasing the size of the dielectric substrate 210.

In one embodiment, the height of the dielectric substrate 210 is the wavelength of the received or transmitted signal divided by four (i.e., $\lambda/4$). In an embodiment where the ground plane 222 is not present, the height of the dielectric slab 210 is λ/2. The wavelength λ, when considered in conjunction with the dielectric substrate 210, is the wavelength in the dielectric, which is always less than the free space wavelength. The antenna directivity is a monotonic function of the dielectric substrate radius. A longer dielectric substrate 210 provides a gradual transition over which the radio frequency signal passes from the dielectric substrate 210 into free space (and vice versa for a received wave). This allows the wave to maintain collimation, which increases the antenna array directivity when the wave exits the dielectric substrate 210. As known by those skilled in the art, generally, the antenna directivity is calculated in the far field where the wave front is substantially planar.

In one embodiment, the passive elements 200, the active element 202 and the dielectric substrate 210 are mounted on a platform or within a housing for placement on a work surface. Such a configuration can be used with a laptop computer, for example, to access the Internet via a CDMA wireless system with the passive elements 200 and the active element 202 fed and controlled by a wireless communications devices in the laptop. In lieu of placing the antenna elements 200 and 202 and the dielectric substrate 210 in a separate package, they can also be integrated into a surface of the laptop computer such that the passive elements 200 and the active element 202 extend vertically above that surface. The dielectric substrate 210 can be either integrated within that laptop surface or can be formed as a separate component for setting upon the surface in such a way so as to surround the passive elements 200. When integrated into the surface, the passive elements 200 and the active element 202 can be foldably disposed so as to contact the surface when in a folded state and deployed into a vertical state for operation. Once the passive elements 200 and the active element 202 are vertically oriented, the separate dielectric slab 210 can be fitted around the passive elements 200.

The dielectric substrate 210 can be fabricated using any low-loss dielectric material, including polystyrene, alumina, polyethylene or an artificial dielectric. As is known by those skilled in the art, an artificial dielectric is a volume filled with hollow metal spheres that are isolated from each other.

Figure 7:
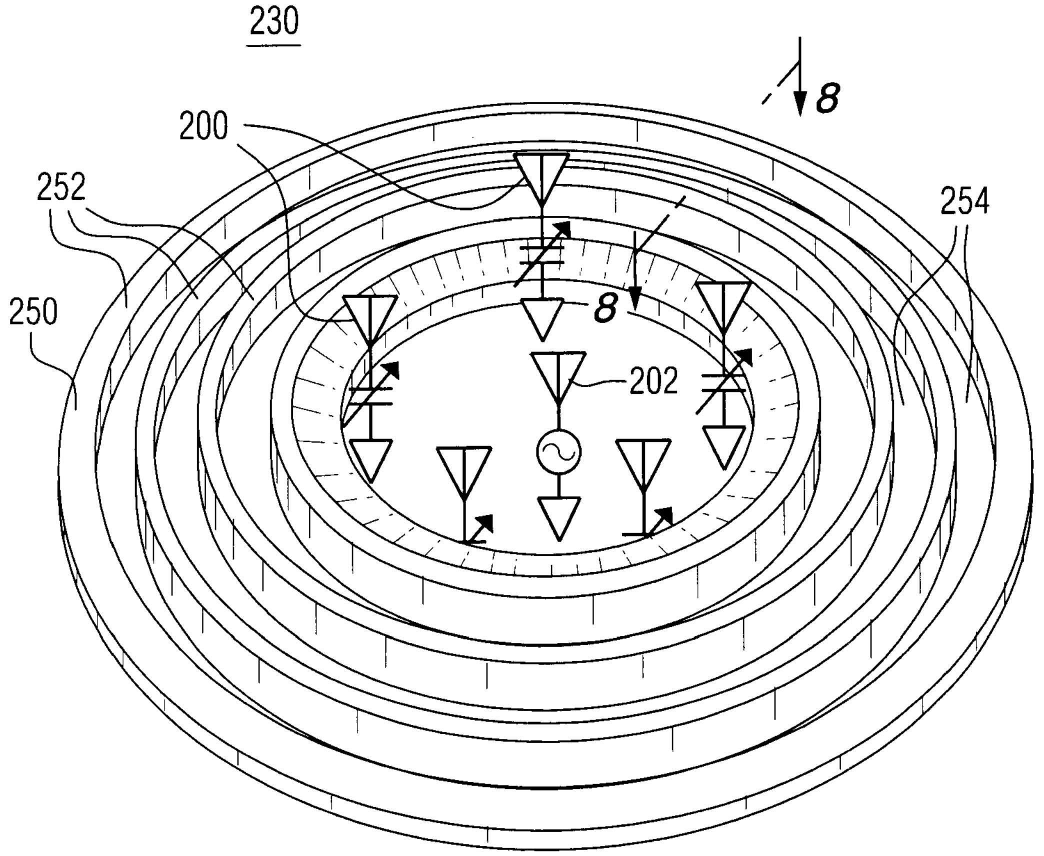
FIGS. 7 and 8 illustrate a corrugated ground plane for producing a more directive antenna beam in accordance with the teachings of the present invention.
Figure 8:
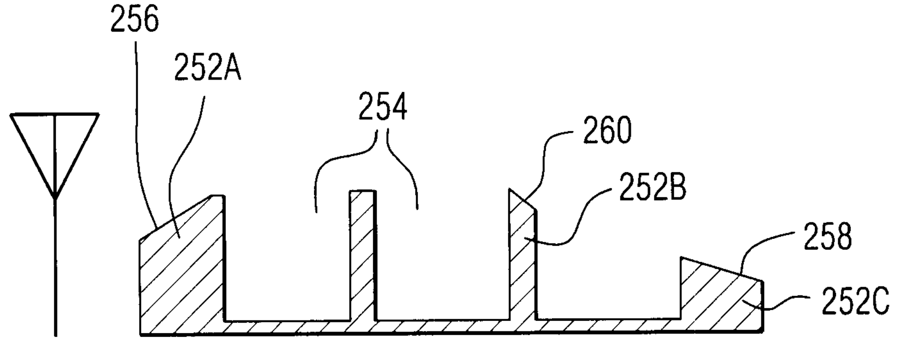

FIG. 7 illustrates an antenna array 230, including a corrugated metal disk 250 surrounding the passive antenna elements 200. The corrugated metal disk 250, which offers similar gain-improving functionality as the dielectric substrate 210 in FIG. 5, comprises a plurality of circumferential mesas 252 defining grooves 254 there between. FIG. 8 is a view through section AA' of FIG. 7. Note that the innermost mesa 252A includes a tapered surface 256. Also, the outermost mesas 252B and 252C include tapered surfaces 258 and 260, respectively. As in the FIG. 5 embodiment, the tapers 256 and 258 provide a transition region between free space and the propagation constant presented by the corrugated metal disk 250. Like the dielectric substrate 210, the corrugated metal disk 250 serves as a slow-wave structure because the grooves 254 are approximately a quarter-wavelength deep and therefore present an impedance to the traveling radio frequency signal that approximates an open, i.e., a quarter-wavelength in free space. However, because the notches do not present precisely an open circuit, the impedance causes bending of the traveling wave in a manner similar to the bending caused by the dielectric substrate 210 of FIG. 5. If the grooves 254 were to provide a perfect open, no radio frequency energy would be trapped by the groove and there would be no bending of the wave. The key to successful utilization of the FIG. 7 embodiment is the trapping of the radio frequency wave. When the grooves 254 are shallow, they release the wave and thus the contouring (i.e., the location of the mesas and grooves) controls the location and degree to which the wave is allowed to radiate to form a collimated wave front. For example, if the grooves were radially oriented, the wave would simply travel along the grooves and could not be controlled. Although the FIGS. 7 and 8 embodiments illustrate only three grooves or notches, it is known by those skilled in the art that additional grooves or notches can be provided to further control the traveling radio frequency wave and improve the directivity of the antenna in the azimuth direction.

Figure 9:
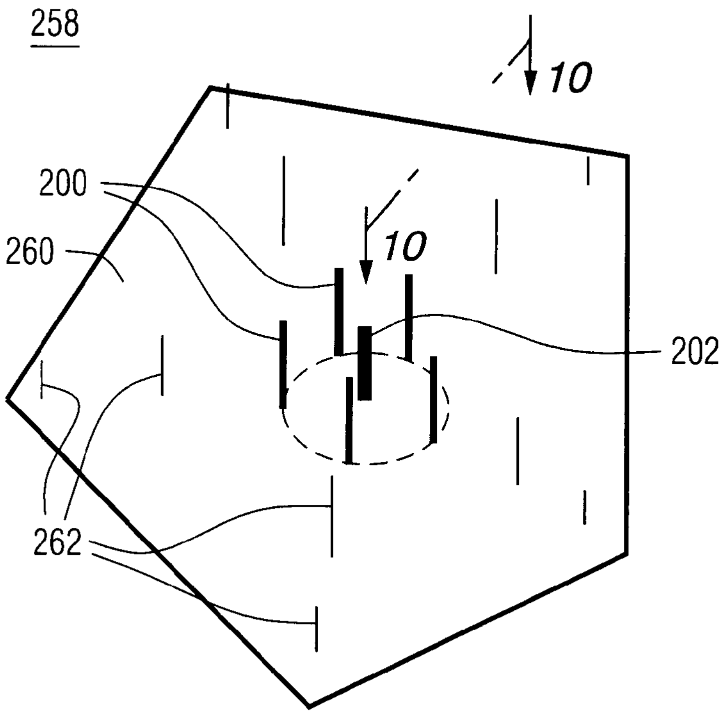
FIGS. 9, 10, 11, 12, 13 and 14 illustrate an embodiment of the present invention including vertical gratings.

FIG. 9 illustrates an antenna array 258 representing another embodiment of the present invention, including a ground plane 260 and the previously discussed active element 202 and the passive elements 200. Additionally, FIG. 9 illustrates a plurality of parasitic conductive gratings 262. In the embodiment of FIG. 9, the parasitic conductive gratings 262 are shown as spaced apart from and along the same radial lines as the passive elements 200. In a sense, the antenna array 258 of FIG. 9 is a special case of the antenna array 230 of FIG. 7. The height of the circumferential mesas 252 is represented by the position of the parasitic conductive gratings 262. The taper of the outer mesas 252B and 252C in FIG. 8 is repeated by tapering the parasitic conductive gratings 262 in the direction away from the center element 202.

Figure 10:
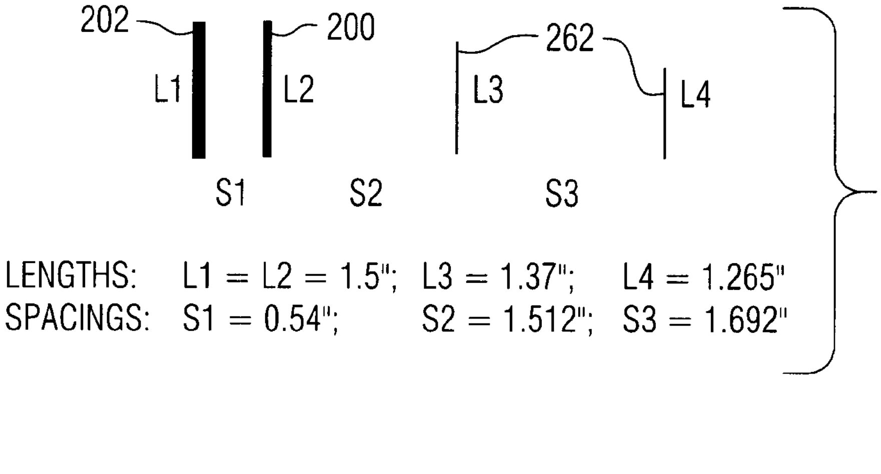

FIG. 10 illustrates the antenna array 258 in cross section along the lines AA'. Exemplary lengths for the passive elements 200 and the active element 202 are also shown in FIG. 10. Further, exemplary height and spacings between the parasitic conductive gratings 262 at 1.9 GHz are also set forth. Generally, the spacing is 0.9λ to 0.28λ. The spacing between the active element 202, the passive elements 200, and the plurality of parasitic conductive gratings 262 are generally tied to the height of each element. If the passive elements 200 and the plurality of parasitic conductive gratings 262 are a resonant length, the element simply resonates and thereby retains the received energy. Some energy may spill over to neighboring elements. If the element is shorter than a resonant length, then the impedance of the element causes it to act as a forward scatterer due to the imparted phase advance. Scattering is the process by which a radiating wave strikes an obstacle, and then re-radiates in all directions. If the scattering is predominant in the forward direction of the traveling wave, then the scattering is referred to as forward scattering. If the element is longer than a resonant length, the resulting phase retardation interacts with the original traveling wave thereby reducing or even canceling the forward travelling radiation. As a result, the energy is scattered backwards. That is, the element acts as a reflector. In the FIG. 9 embodiment, the plurality of parasitic conductive gratings 262 can be either shorted to the ground plane 260 or adjustably reactively loaded, where the loading effectively adjusts the effective length of any one of the plurality of parasitic conductive gratings 262 causing the parasitic conductive grating 262 to have a length equal to, less than or greater than the resonant length, with the resulting directive or reflective effects as discussed above. Providing this controllable reactive feature provides the ability to vary the degree of directivity or beam pattern width as desired.

It should also be noted that in the FIG. 9 embodiment the ground plane 260 is pentagonal in shape. In another embodiment, the ground plane can be circular. In one embodiment, the number of facets in the ground plane 260 is equal to the number of passive elements. As in the embodiments of FIGS. 5 and 7, the plurality of gratings or parasitic conductive elements 262 serve to slow down the radio frequency wave and thus improve the directivity in the azimuth direction. Adding more gratings causes further reductions in the RF energy in the elevation direction. Note that the beam pattern produced by the antenna array 258 includes five individual and highly directive lobes when each of the passive elements 200 is placed in the directive state. When two adjacent passive elements 200 are placed in a directive state, the highly directive lobe formed is in a direction between the two directive elements. When all passive elements 200 are placed in a directive state simultaneously, an omni-directional pancake pattern is created.

As compared with the notches of FIG. 7, the parasitic conductive gratings 262 of FIG. 9 have sharper resonance peaks and therefore are very efficient in slowing down the traveling RF wave. However, as also discussed in conjunction with FIG. 7, the parasitic conductive gratings 262 are not spaced at precisely the resonant frequency. Instead, a residual resonance is created that causes the slow-down effect in the radio frequency signal.

The antenna array 270 of FIG. 1 includes the elements of FIG. 9, with the addition of a plurality of interstitial parasitic elements 270 between the parasitic conductive gratings 262, to further guide and shape the radiation pattern. The interstitial parasitic elements 270 are shorted to the ground plane 260 and provide additional refinement of the beam pattern. The interstitial parasitic elements 270 are placed experimentally to afford one or more of the following objectives: reducing the ripple in the omnidirectional pattern, adding intermediate high-gain beam positions when the array is steered through the resonant characteristic of the parasitic elements 200, reducing undesirable side lobes and improving the front to back power ratio.

Figure 11:
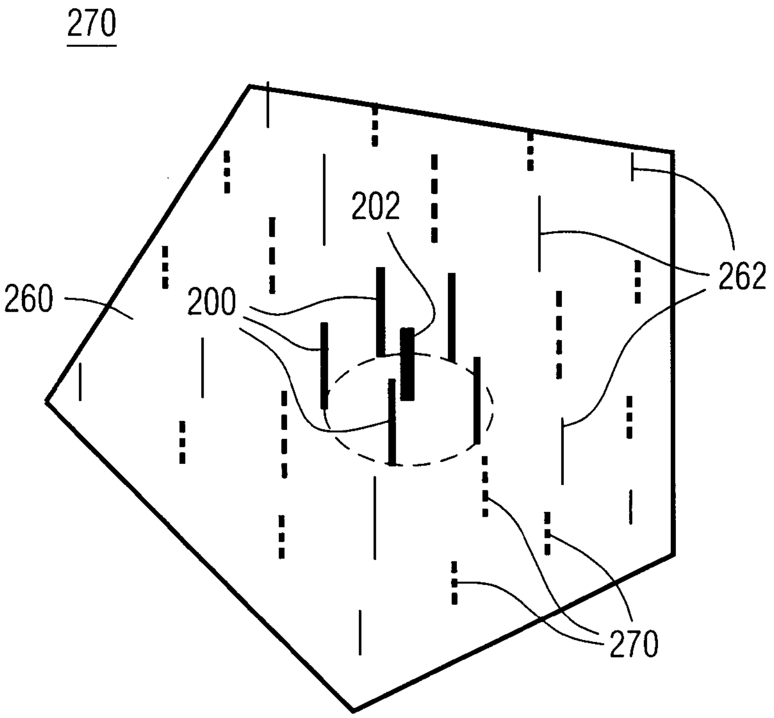

In one embodiment, an antenna constructed according to the teachings of FIG. 11, has a peak directivity of 8.5 to 9.5 dBi over a bandwidth of thirty percent. By electronically controlling the reactances of the passive elements 200, this high-gain antenna beam can also be steered. When all of the passive elements 200 are in the directive mode, an omnidirectional beam substantially in the azimuth plane is formed. In the omnidirectional mode, the peak directivity was measured at 5.6 to 7.1 (dBi) over the same frequency band as the directive mode. Thus, the FIG. 11 embodiment provides both a high-gain omnidirectional pattern and a high-gain steerable beam pattern. For an antenna operative at 1.92 GHz in one embodiment, the approximate height of the interstitial parasitic elements 270 is 1.5 inches and the distance from the active element 202 to the outer interstitial parasitic elements 270 is approximately 7.6 inches.

Figure 12:
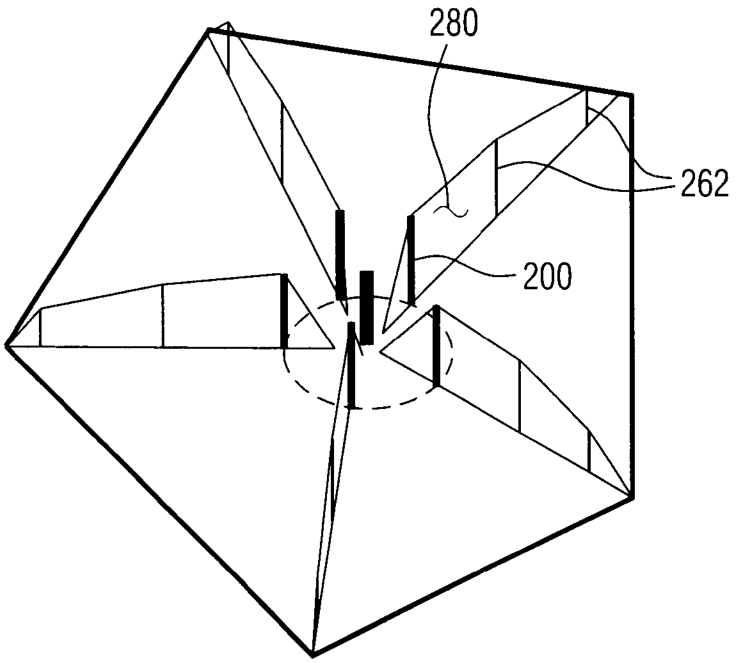

The antenna array of FIG. 12 is derived from FIG. 9, where the parasitic conductive gratings 262 and the passive elements 200 are integrated into or disposed on a dielectric substrate or printed circuit board 280. Note that in the FIG. 9 embodiment, the passive elements 200 and the parasitic conductive gratings 262 are fabricated individually. The passive elements 200 are separated from the ground plane 260 by an insulating material and conductively connected to the reactance control elements previously discussed. The parasitic conductive gratings 262 are shorted directly to the ground plane 260 or controllably reactively loaded as discussed above. Thus the process of fabricating the FIG. 9 embodiment is time intensive. The FIG. 12 embodiment is therefore especially advantageous because the parasitic conductive gratings 262 and the passive elements 200 are printed on or etched from a dielectric substrate or printed circuit board material. This process of integrating and grouping the various antenna elements as shown, provides additional mechanical strength and improved manufacturing precision with respect to the height and spacing of the elements. Due to the use of a dielectric material between the various antenna elements, the FIG. 12 embodiment can be considered a hybrid between the dielectric substrate embodiment of FIG. 5 and the conductive grating embodiment of FIG. 9. In particular, the dielectric substrate 280 smooths out the discrete resonant properties of the parasitic conductive gratings 262, thereby reducing the formation of gain spikes in the frequency spectrum of the operational bandwidth.

Figure 13:
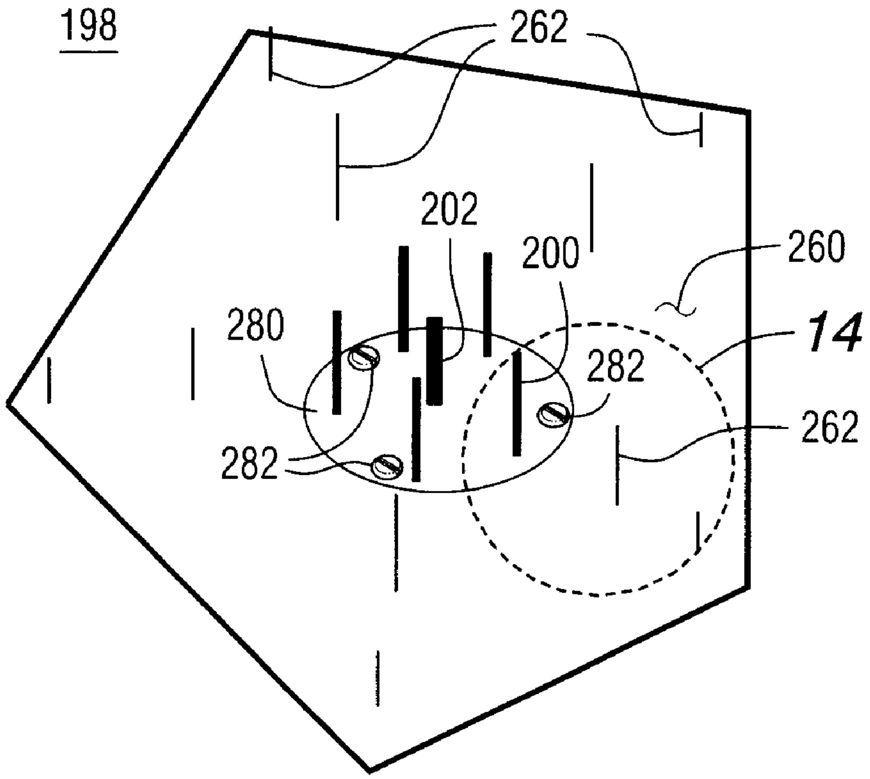
Figure 14:
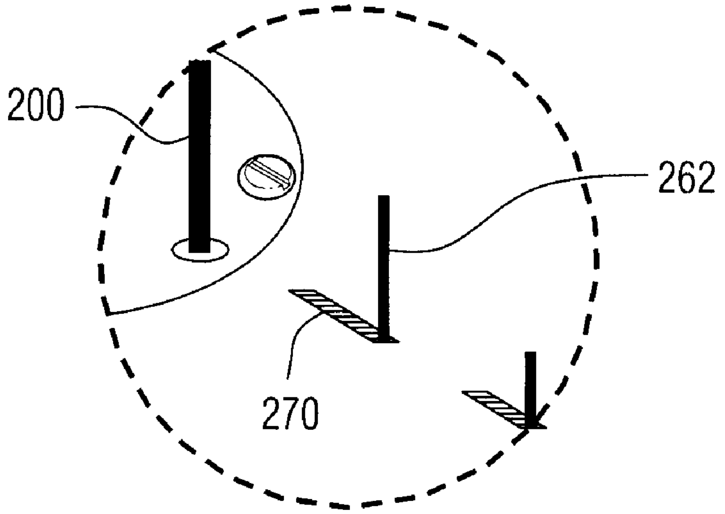

FIG. 13 illustrates another process for fabricating the antenna array 258 of FIG. 9 and the antenna array 270 of FIG. 11. In the FIG. 13 process, the parasitic conductive gratings 262 (and the interstitial parasitic elements 270 in FIG. 11) are stamped from the ground plane 260 and then bent upwardly to form the parasitic conductive gratings 262 (and the interstitial parasitic elements 270 in FIG. 11). This process is illustrated in greater detail in the enlarged view of FIG. 14. In one embodiment, the parasitic conductive gratings 262 the interstitial parasitic elements 270 are formed by creating a U-shaped slot in the in the ground plane 260 such that a deformable joint is defined by the slot. The parasitic elements are then formed by upwardly bending that region of the ground plane 260 defined by the slot along the deformable joint. The void remaining after stamping three sides of the ground plane 260 is referred to by reference character 270. It has been found that the void 270 does not significantly affect the performance of the antenna array 258 (FIG. 9) and 270 (FIG. 11). In the FIG. 13 embodiment, the active element 202 and the passive elements 200 are formed on a separate metallic disc 280, which is attached to the ground plane 260 using screws or other fasteners 282.

While the invention has been described with reference to a preferred embodiment, it will be understood by those skills in the art that various changes may be made and equivalent elements may be substituted for elements thereof without departing from the scope of the present invention. In addition, modifications may be made to adapt a particular situation more material to teachings of the present invention without departing from the essential scope thereof. Therefore, it is intended that the invention not be limited to the particular embodiment disclosed at the best mode contemplated for carrying out this invention, but that the invention include all embodiments falling within the scope of the appended claims.

What is claimed is:

1. An antenna comprising:

an active element;

a plurality of passive elements spaced apart from and circumscribing said active element; and a dielectric substrate surrounding said active element and said plurality of passive elements, wherein said dielectric substrate has a lower propagation constant than the propagation constant of air, such that the radio frequency wave emitted by said active element in the transmitting mode or received by said active element in the receiving mode is tilted toward the plane of the dielectric substrate due to the lower propagation constant.

2. The antenna of claim 1 wherein the antenna directivity is increased along a longitudinal plane through the dielectric substrate.

3. The antenna of claim 1 wherein the antenna radiation is attenuated in a direction perpendicular to the dielectric substrate.

4. The antenna of claim 1 wherein the dielectric substrate is in the shape of a ring, including a circular band defining a central aperture wherein the active element and the plurality of passive elements are located within the central aperture.

5. The antenna of claim 4 wherein the surface of the circular band defining the central aperture forms a downward taper from the top surface of the dielectric substrate toward the bottom surface of the dielectric substrate in the direction of the ring center.

6. The antenna of claim 4 wherein the outer edge of the ring has a taper from the top surface of the dielectric substrate toward the bottom surface of the dielectric substrate in the direction away from the ring center.

7. The antenna of claim 4 further comprising a ground plane oriented below the dielectric substrate, wherein the height of the dielectric substrate is a quarter-wavelength of the received or transmitted signal frequency.

8. The antenna of claim 7 wherein the received or transmitted signal frequency is the carrier frequency in a code-division multiple access system.

9. The antenna of claim 1 wherein the dielectric substrate is fabricated of a low loss dielectric material.

10. The antenna of claim 9 wherein the material is selected from the group comprising, polystyrene, alumina, polyethylene and an artificial dielectric.

11. The antenna of claim 1 further comprising a ground plan below the dielectric substrate.

12. The antenna of claim 1 wherein the active element and the plurality of passive elements are vertically oriented.

13. The antenna of claim 12 wherein the plurality of passive elements are equally spaced apart from the active element.

14. The antenna of claim 12 wherein the plurality of passive elements includes at least three passive elements.

15. The antenna of claim 12 wherein at least one of the plurality of passive elements comprises an adjustable load impedance.

16. An antenna comprising:

an active element;

a plurality of directing parasitic elements spaced apart from and circumscribing said active element, wherein the length of the parasitic elements is tapered downwardly in a direction away from the active element; and a plurality of passive elements spaced between said active element and said plurality of parasitic elements, and circumscribing the active element.

17. The antenna of claim 16 wherein the plurality of passive elements are equi-distant from the active element.

18. The antenna of claim 16 wherein each one of the plurality of passive elements has an independently selectable impedance.

19. The antenna of claim 16 wherein the plurality of parasitic elements are arranged in concentric circles extending outwardly from the active element.

20. The antenna of claim 19 wherein the concentric circles comprise one or more inner concentric circles and an outer concentric circle, and wherein the parasitic elements comprising the outer concentric circle are shorter than the parasitic elements comprising the one or more inner concentric circles.

21. The antenna of claim 16 wherein the active element, the plurality of parasitic elements and the plurality of passive elements are vertically oriented, including a ground plane, beneath and proximate to the lower end of the active element, the plurality of parasitic elements and the plurality of passive elements.

22. The antenna of claim 21 wherein the plurality of parasitic elements are formed by creating a U-shaped slot in the ground plane such that a deformable joint is defined by the slot and wherein the plurality of parasitic elements are created by bending the ground plane region defined by the U-shaped slot upwardly along the deformable joint.

23. The antenna of claim 16 wherein each one of the plurality of parasitic elements has a controllable reactance.

24. The antenna array of claim 16 wherein the active element; the plurality of directing parasitic elements and the plurality of passive elements are vertically disposed from a planar surface, and wherein the antenna radiation is tilted toward the planar surface.

25. The antenna of claim 21 wherein at least one of the plurality of parasitic elements is formed by forming a tab within an opening in the ground plane, and wherein the tab is deformable along a line joining the tab to the ground plane, and wherein the tab is deformed into a substantially vertical position with respect to the ground plane to form the at least one parasitic element.

26. The antenna of claim 16 wherein the plurality of parasitic elements are disposed in a non-radial orientation with respect to the active element.

27. An antenna comprising:

an active element;

a plurality of passive elements spaced apart from said active element; and a structure in the shape of a ring including a central aperture, said structure oriented such that said plurality of passive elements are disposed within the central aperture, wherein said structure further includes a plurality of concentric mesas defining a plurality of concentric grooves there between.

28. The antenna of claim 27 wherein the plurality of mesas have unequal heights.

29. The antenna of claim 28 wherein the top surface of the innermost mesa is tapered upwardly moving away from the central aperture.

30. The antenna of claim 27 wherein the top surface of the mesas near the outer edge are tapered downwardly moving away from the central aperture.

31. The antenna of claim 27 wherein the antenna radiation is attenuated in a direction perpendicular to the slow wave structure.

32. An antenna comprising:

an active element;

a ground plane proximate the base of said active element;

a plurality of vertical parasitic elements spaced apart from said active element;

a plurality of passive elements spaced between said active element and said plurality of parasitic elements;

a dielectric substrate; and wherein one of said plurality of passive elements and at least one of said plurality of parasitic elements are disposed on said dielectric substrate, and wherein said dielectric substrate is vertically affixed to said ground plane, and wherein said at least one parasitic element vertically affixed to said dielectric substrate is shorted to said ground plane.

33. The antenna of claim 32 comprising a plurality of dielectric substrates, wherein each one of the plurality of dielectric substrates includes one of the plurality of passive elements and at least one of the plurality of parasitic elements.

34. The antenna of claim 33 wherein each one of the plurality of dielectric substrates has a first taper on the edge proximal the active element and second taper on the edge distal the active element.

* * * * *